INVENTORS
Oskar Henke
Alfred Lukas

BY *Stice & Stice*

ATTYS.

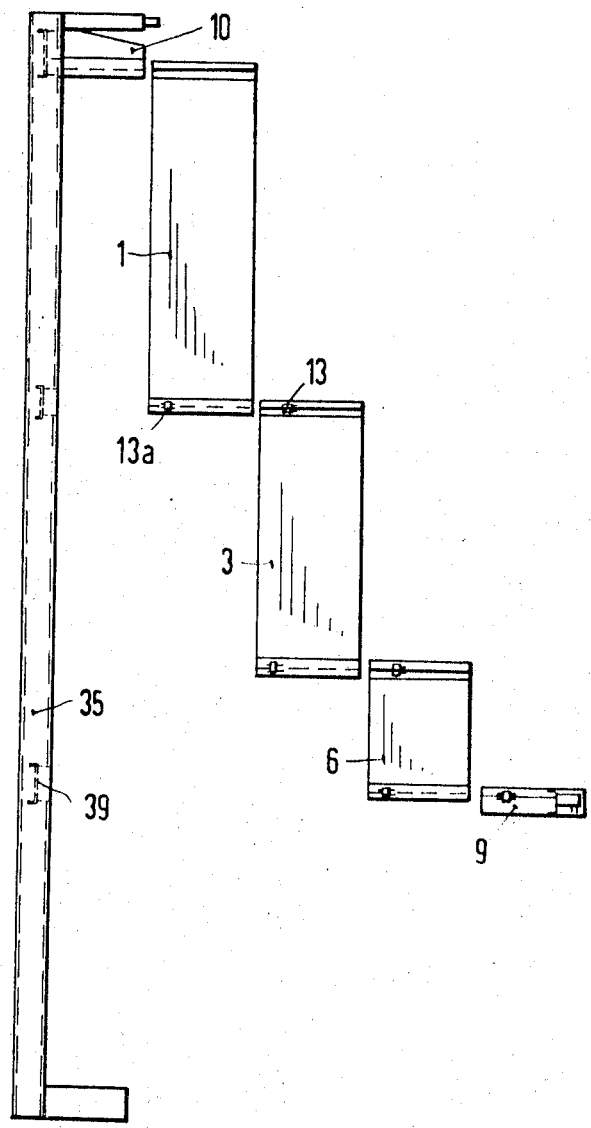

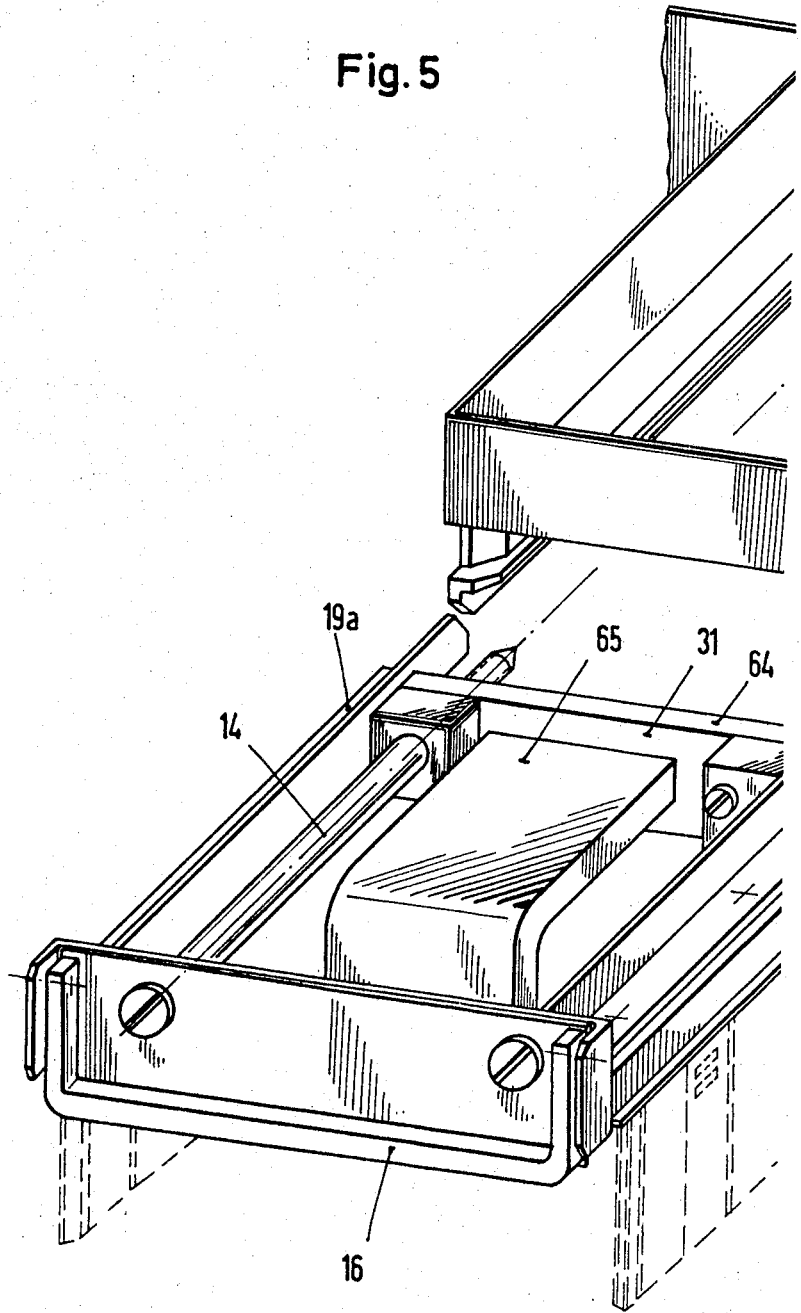

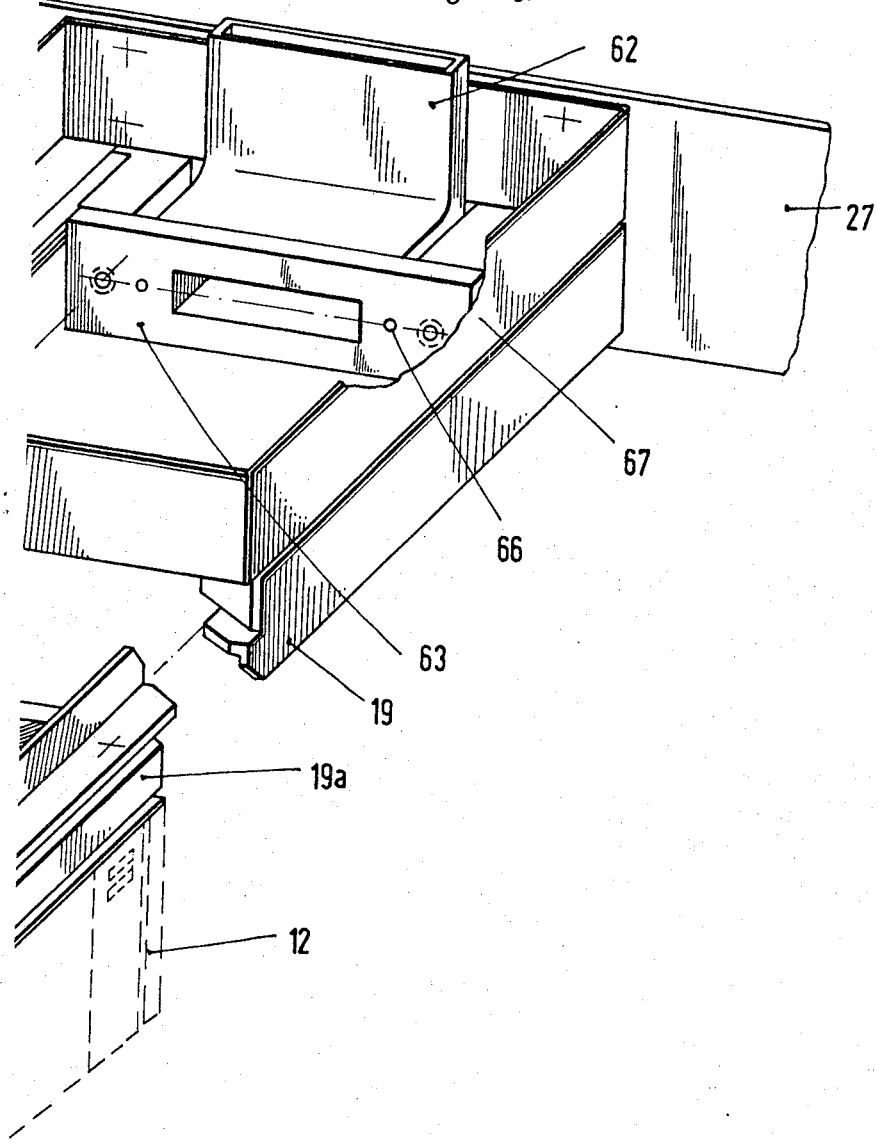

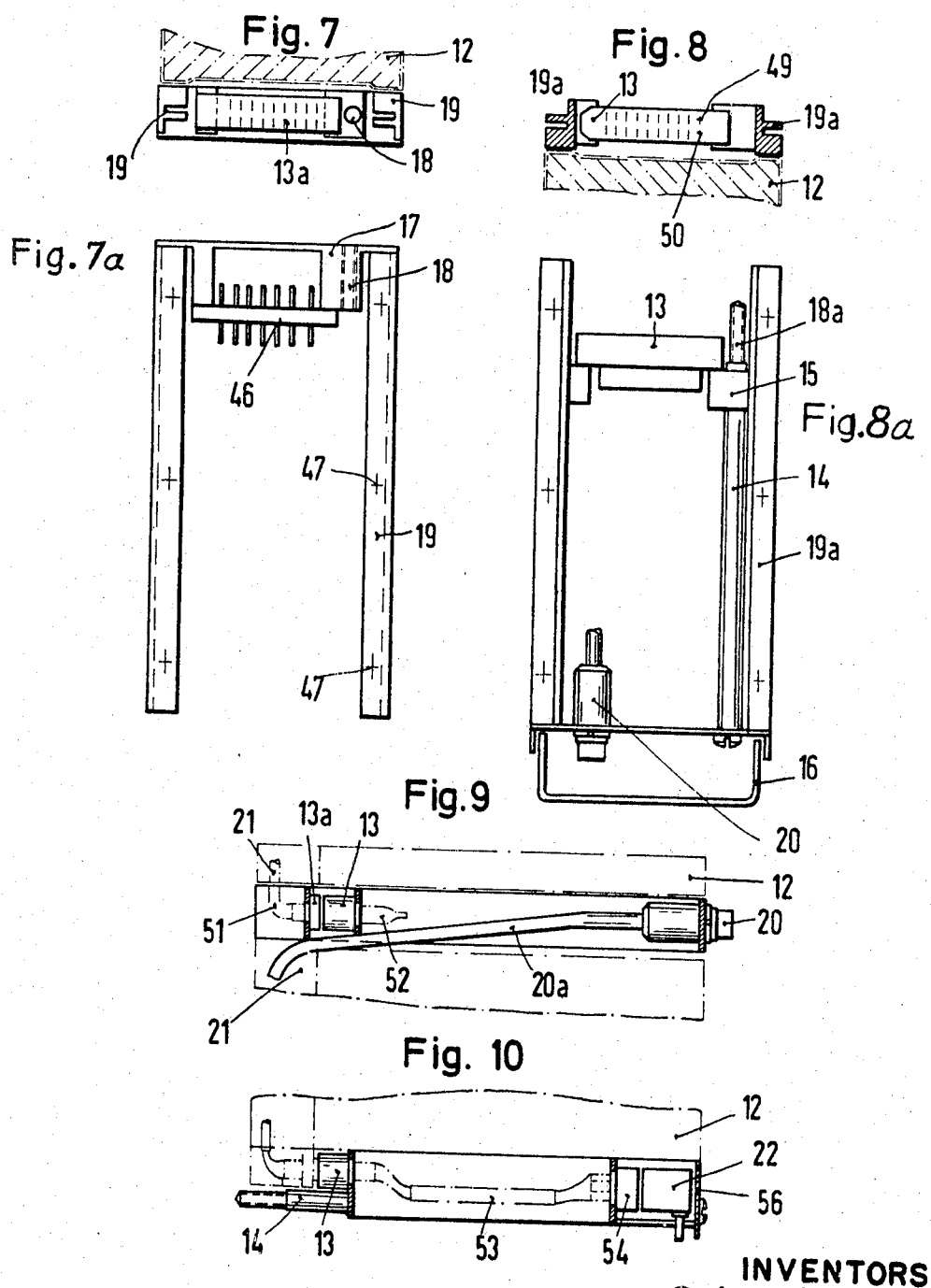

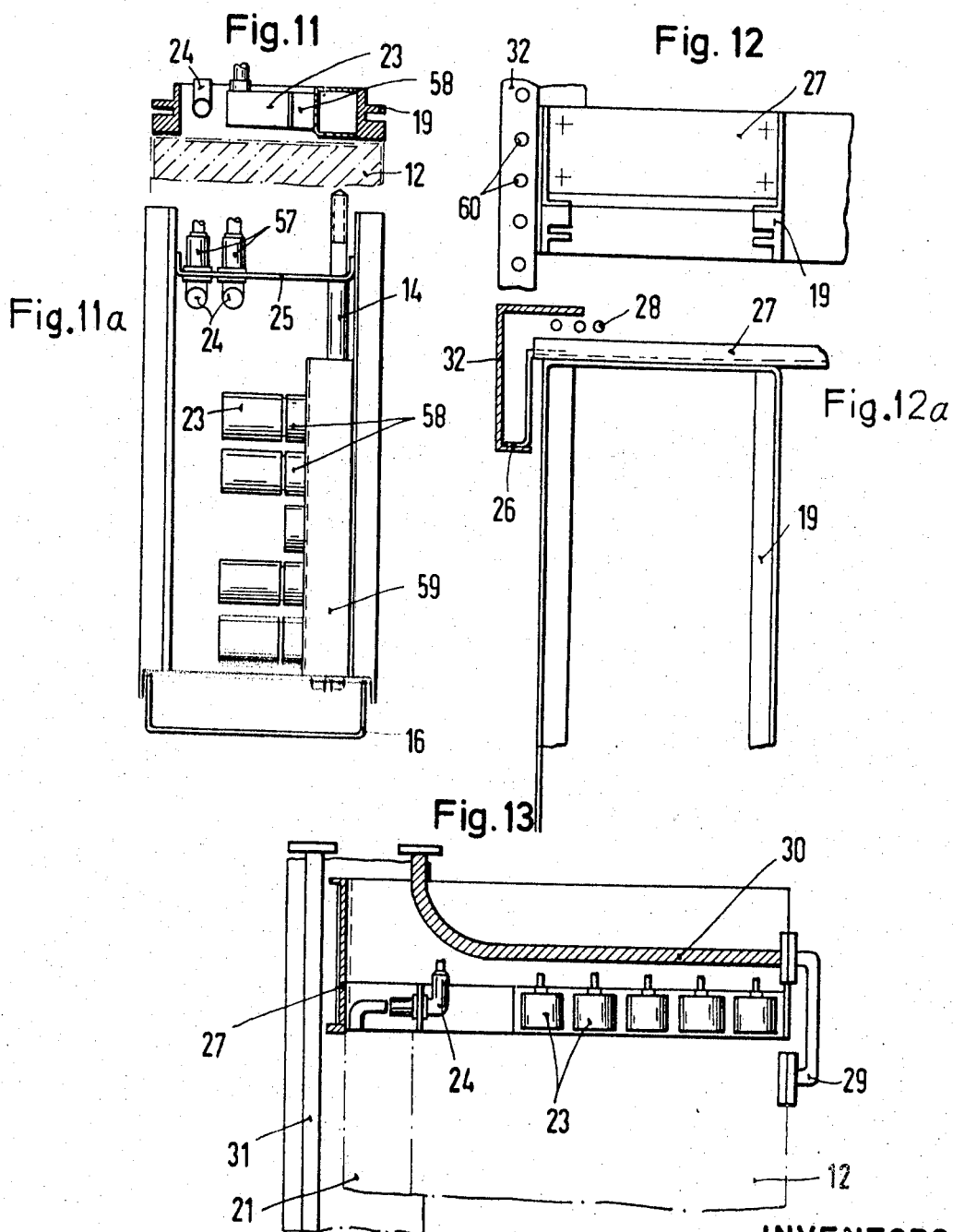

United States Patent Office 3,453,497
Patented July 1, 1969

3,453,497
APPARATUS ARRANGEMENT FOR ELECTRICAL COMMUNICATION EQUIPMENT, PARTICULARLY DIRECTIONAL RADIO EQUIPMENT
Oskar Henke, Munich, and Alfred Lukas, Munich-Aubing, Germany, assignors to Siemens Aktiengesellschaft, a corporation of Germany
Filed June 7, 1967, Ser. No. 644,320
Int. Cl. H02b 1/04
U.S. Cl. 317—99                                              11 Claims

ABSTRACT OF THE DISCLOSURE

An apparatus arrangement for electrical communication equipment utilizing supporting structures of the rack type, in which apparatus component units such as transmitters and receivers, modulators and demodulators, power supply structures, and if necessary junction and distribution panels, monitoring equipment, etc., are assembled in vertical relation to form elongated vertically disposed assemblies or inserts which are disposed side by side and supported from their upper ends by suitable guide rails in a rack structure, capable of being connected vertically by plug and socket connections on the adjacent units and connected laterally, as well as between other racks and with the telephone exchange, with plug-in connections, with the high frequency connections effected from the top of the insert, preferably from the front thereof, whereby maximum freedom in arrangement may be realized.

---

The invention relates to an apparatus arrangement for electrical communication equipment particularly directional radio equipment, in a rack structure with retaining devices for supporting vertical, elongated inserts, of which some can be pushed in and placed side by side in the rack panel or are retractable, and are electrically connected preferably by detachable conductors or cables which are connected through plug-in connection with other inserts, other racks and with the telephone exchange.

An installation rack, especially for application in carrier frequency engineering, is known in which individual structural components, e.g. plug-in structural components are combined into vertical elongated inserts which are pushed in and placed side by side in a rack structure by means of cooperable guide rails on the racked insert, or are first engaged with a suspension means in the track and then inserted into the rack through a pivotal movement of the elongated insert. Especially in the field of directional radio engineering the need exists to assemble installations in freely selectable combination without necessarily changing the rack, its wiring or its vertical inserts. Such directional radio installation can employ different equipment, depending on whether it is in an initial, intermediate or final position. In addition, there are many special conditions, e.g. diversity reception or a supplementary feed of modulation signals in intermediate position. Moreover, auxiliary apparatus of the most varied kind are needed for remote monitoring or for other measurement.

The problem underlying the invention is to improve, in particular, this known type or arrangement in such a way with respect to the layout of equipment and the connection or wiring technique with respect thereto that an arrangement is created which first of all meets the above mentioned requirements.

This problem of producing an arrangement of electrical communication equipment, especially for directional radio engineering, in a carrying rack with supporting devices for suspending vertical elongated inserts, of which some can be pushed and placed side by side in the rack, or are retractable, and are electrically connected with the aid of, preferably, detachable conductors which are connected, through plug-in connections, with other inserts, with other racks, and with the telephone exchange, is solved by an arrangement in which the equipment components (comprising a transmitter, receiver, modulator, demodulator or a power supply unit, etc., which in each case is an operable structural unit per se, and if necessary under intercalation of units constituting an electrical junction panel, distribution panel, or monitoring panel) originating from at least one suspension device are jointed together in a vertical row in an arbitrarily selected succession, by means of guide rails located at the top and bottom of the unit assemblies and interlocking with each other. Such rails are of like construction for all apparatus units, each of which simultaneously carry, for effecting at least the majority of electrical connections of the apparatuses, such as electrical plug and socket boards for the connection of supply conductors and/or high frequency conductors.

As a result of such a constructional arrangement of the individual apparatus units, flexibility in the possible combinations of the individual apparatus units is attained, such as is otherwise only permitted in a laboratory construction. This will be apparent from the practical and advantageous developments of the invention hereinafter described.

The individual unit consists of a U-shaped shell which is open at the front side, of a length adapted to the specific space required for the unit, and which is terminated at each end by a component part primarily comprising the combination of guide rails and plug units.

In order to completely eliminate, as much as possible, wiring changes of the component parts in such installation, it is of advantage that in the plug and socket connections of each unit, the same supply voltages, signal voltages, or similar conductors for various units extend to the same pairs of plugs and sockets of each unit, which, if necessary, are extended through the units. The connections between units which are suspended side by side (each forming a vertical insert) are constructed as detachable conductors or cables producing the necessary horizontal cross connections and in which, if necessary, a form of multiple distributors, attachable to the free lower terminal connection block of the vertical inserts, is provided for current supply from the public power circuit, which distributors are adapted to the combination guide rails and plug units.

A necessary high frequency connection, such as a waveguide antenna connection terminating in a flange, is laterally arranged at the top of the unit and preferably also at the top of a vertical insert, and if good accessibility is required, is disposed at the front side of the units, from which it is connected, employing flanged connections, by means of a semi-circular-shaped section or another known waveguide section with the extension of the high frequency conductor (waveguide) being attached to the suspension means for the vertical insert and located thereabove.

Should accessibility of such high frequency connection not be necessary at all times, it is more expedient to arrange it at the rear side of the unit opposite the high frequency connection (waveguide) flange or coaxial conductor flange or coaxial conductor flange located thereat adjacent the side of the rack and to provide centering elements directly around the connection, such as bolts and sleeves which can be slid thereover, through which the two flanges to be connected are aligned with each other when the unit is being pushed in and can brace each other by screw connections brought out to the front side.

The suspension means located at the top of a vertical row of units likewise comprises the combination of plug socket bands and guide rails, whose electrical connections to the telephone exchange or, as the case may be, to other vertical inserts or racks extend to plug connection bands located, in particular, in the space between the guide rails (junction panel on the suspension means).

In many cases, however, it will be more advantageous to simplify the wiring or cabling, to run the electrical connections of the unit, especially those provided as the conductors for the intermediate frequency, the lower frequency and direct current to other racks or other vertical inserts or the telephone exchange, to socket boards located in the free space between the upper guide rails of such unit.

A particularly preferred arrangement of units is one in which, in vertical succession, starting from the suspension means there are arranged in a row the transmitter, the modulator, and the power supply unit, while in the vertical row located next to it there are arranged the receiver, the demodulator and thereafter the power supply unit or a voltage regulating unit, and in which the transmitter of the apparatus is connected at the front side of the structural units with the receiver through a flexible length of cable provided at both ends with plug connections, which conducts forward the auxiliary frequency for the receiver oscillator.

In order to connect the apparatus units with the power supply, the signal control installation of the rack, the incoming and outgoing telephone exchange leads or to cross-connect individual, vertical rows, flexible cables can be readily provided, for the accommodation of which narrow spaces are left between the vertical inserts, and between the rear face of the rack and the adjacent rear faces of the units.

In the drawings, wherein like reference characters indicate like or corresponding parts:

FIG. 2 illustrates a side view of the rack with units which are illustrated in their relative positions prior to insertion into the rack;

Figure 6:
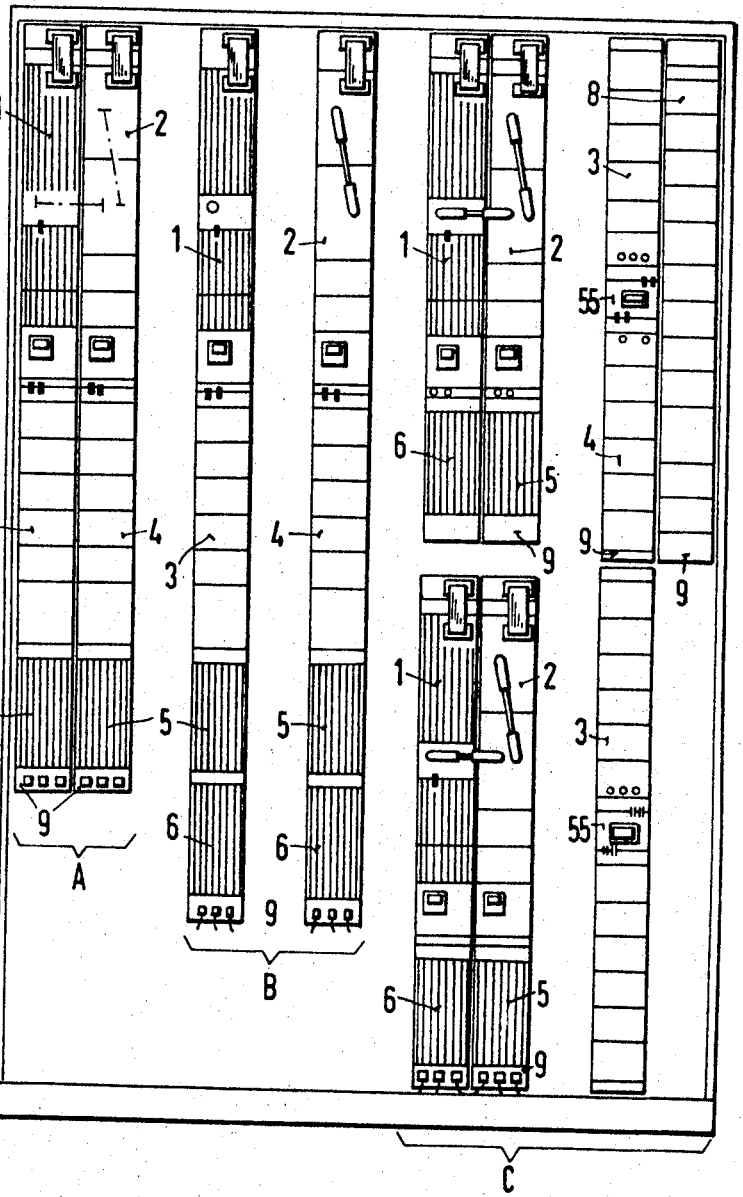

FIGS. 5 and 5a cooperally illustrate in perspective a suspension device with a rearwardly extending waveguide connection;

FIG. 6 illustrates different combinations of units according to the invention which are placed in one and the same rack;

FIG. 7 is an end elevation of a pair of guide rails and cooperable plug board;

FIG. 7a is a top plan view of the rail structure illustrated in FIG. 7;

FIG. 8 is a section through the counterpart of the rail structure of FIGS. 7 and 7a;

FIG. 8a is a top plan view of the rail structure illustrated in FIG. 8;

FIG. 9 is a section illustrating portions of the structure illustrated in FIGS. 8 and 8a;

FIG. 10 is a section similar to FIG. 9, illustrating details of a distribution panel;

FIG. 11 is a section similar to FIG. 8 of a distribution panel;

FIG. 11a is a top plan view of the panel structure of FIG. 11;

FIG. 12 is a rear elevational view of a portion of a rack structure;

FIG. 12a is a plan view of the structure illustrated in FIG. 12; and

FIG. 13 is a sectional view of a suspension device with a forwardly extending waveguide connection.

Figure 1:
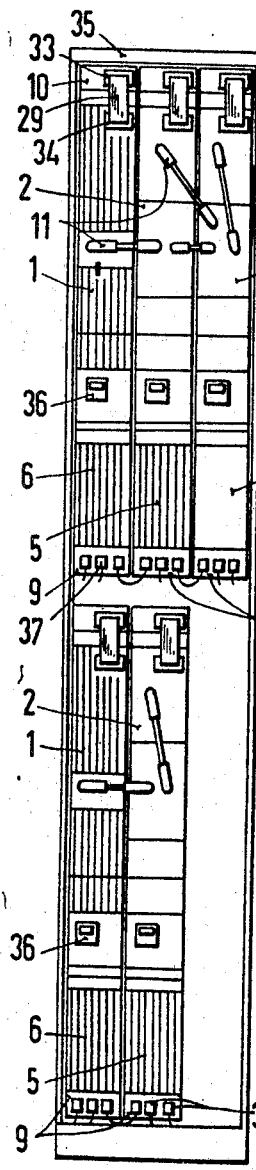
FIG. 1 illustrates a front view of a rack containing units in accordance with the invention.

In the embodiment according to FIG. 1 a number of individual parts of a signaling apparatus which are respectively operable, as initially explained, are contained in a rack 35. Such individual parts which, for the sake of simplicity, will hereinafter be referred to as units, comprise, for example, a transmitter, a receiver, a modulator, a demodulator, and a power supply unit, as well as other apparatus necessary for the operation or supervision of the signal communication functions. In the embodiment according to FIG. 1 a transmitter comprises an oscillator, an amplifier stage and an output stage, and a receiver 2 comprises components necessary to complete a directional radio system particularly for very high frequencies, for example, in the 7 gHz. range. Since the embodiment illustrated is equipped for diversity reception, an additional receiver 7, including the supplementary devices necessary for the transfer of one receiver to another, is provided. The supplementary devices are located in the lower part of the elongated vertical insert which is generally designated by the reference numeral 7. A power supply unit 6 and an additional public power supply connection unit which contains distributor plugs or distributor plug sockets is also provided. In accordance with the invention, as hereinafter explained in detail, units 6 and 9 are mechanically and electrically connected with the transmitter 1. Such a vertical row of units, e.g. transmitter 1, power supply unit 6 and additional unit 9, is hereinafter termed a vertical insert. The assignment of the individual units may be completely artibrary and adapted to the requirements of each individual case. However, the unit having the high frequency antenna connection is usually to be placed at the top of a vertical insert. The center vertical insert in the embodiment according to FIG. 1 comprises, for example, receiver 2 and a voltage regulating apparatus 5 for supplying units 1, 2 and 7 with at least one controlled voltage. Such a constant voltage, which is practically independent of fluctuation in the supply voltage, will, as a rule, be necessary for individual parts and circuits. Underneath the three vertical inserts in the upper part of the rack is another transmitter 1 with power supply unit 6 and a single receiver 2 with a voltage regulating unit 5. Therebelow can be seen the additional connection unit 9 for the public current supply. Some hand plugs of such connection unit are designated by the numeral 37. In addition, on the front panels of the individual apparatus, recording instruments 36 can be seen which will be necessary for supervising individual voltages.

The majority of electrical connection between the individual unit assemblies are established by way of plug and socket boards which are located at the lower and upper ends of the individual units in the vicinity of the mechanical attaching elements as hereinafter explained in detail. However, since high frequency connections, as a rule, are supposed to be readily accessible from the front, i.e. from the front side of the units, such individual coaxial transmission line connections or guidewave connections are formed by bridge elements that can be plugged in. Such coaxial transmission line connections are designated by the reference numeral 11. They serve, for example, for supplying the oscillator frequency of the transmitter to the receiver or vice versa in systems operating with frequency conversions. At the top of each of the vertical inserts are provided the high frequency connections, in this case waveguide connections. The connections of the vertical inserts to the rack are established by way of a waveguide connecting piece 29 which is provided on respective ends with flanges 33 and 34. For these cases in which the waveguide connection is disposed at the front, it is of advantage that the flanges be easily accessible, and that the bridges 29, if necessary, can be replaced by instrument conductors, artificial antenna and the like.

Similar bridges, such as those designated by the reference numeral 11 or 29 for very high frequencies, are provided, in particular, for bridging in a vertical direction for middle frequencies, for example, for the intermediate frequency. Such bridges are designated by the reference numeral 38 in subsequent figures (see, for example, FIG. 6a).

The concept of the invention, according to which some units are assembled to form a vertical insert, can be seen from FIG. 2. In this figure, schematically illustrating a side view, a rack panel can be recognized, which primarily comprises side rails and serves practically only for the suspension of the vertical inserts. Hence, a suspension device 10 is disposed at the upper end of the structure illustrated. In accordance with the invention, each unit, for example the unit 1 transmitter, which has not yet been inserted, is provided with guide rails at its upper and lower ends, and the suspension device 10 is provided with counterparts corresponding thereto. The unit 1 is now pushed into the guide rails of the expansion device, entering between the right and the left guide rails, and as can better be seen from FIGS. 7 and 8 which will be subsequently explained, there also is enough room for suspending a plug connection. The arrangement of such plug connection likewise can better be seen from FIGS. 7 and 8. In FIG. 2 only one connector socket part 13 is indicated above unit 3 and a plug part 13a underneath unit 1. The plug and socket portions can also be attached to the units in reverse order, depending on whether the power supply takes place from above or below. In this example the power supply takes place from the power supply unit located therebelow, and consequently, the socket board is attached to the upper side of the lower unit. The guide rails and the appertaining counterparts are the same for each unit, so that, as indicated in FIG. 2, units 9, 6, 3 and 1 can be interlocked with each other, and unit 1, in its turn, can be interlocked with the suspension device 10. In inserting the units into their final position, the electrical terminals under the individual units are connected by means of the plug and socket boards. In this case, unit 3 comprises modulation equipment for the transmitter 1.

The rack, as indicated, is reinforced by means of cross members 39, and the suspension devices can be attached to the cross members at the top of the structure.

Figure 3:
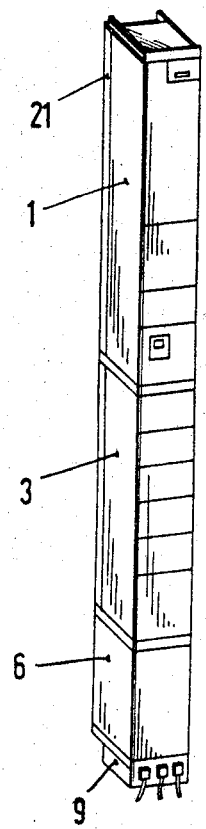
FIG. 3 illustrates in perspective a vertical insert comprising various units.

FIG. 3 illustrates in perspective the combination of transmitter 1, modulator 3, power supply 6 and additional power supply unit 9.

Figure 4:
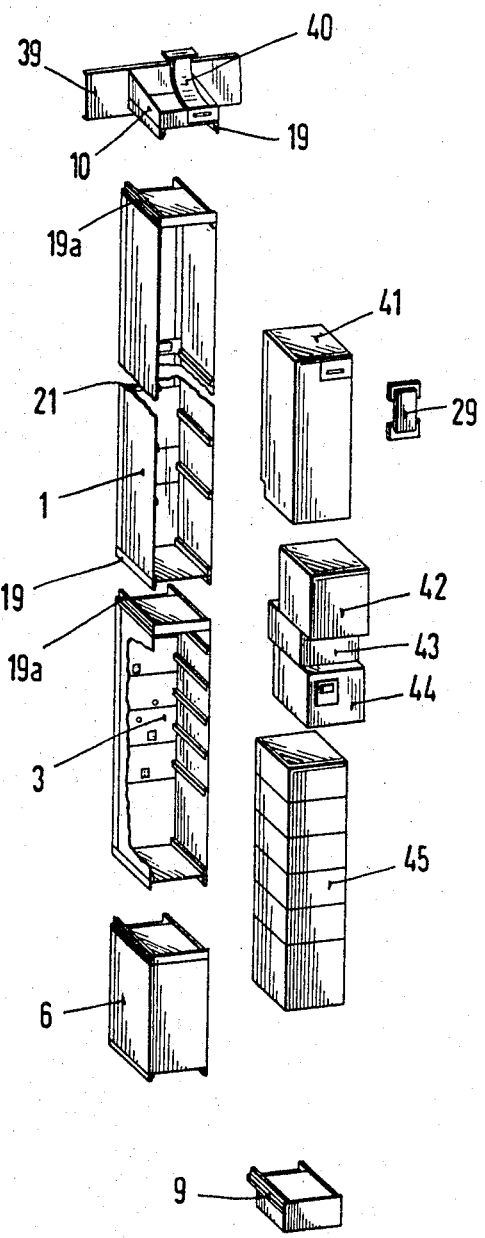
FIG. 4 is an exploded view of a vertical insert illustrating in combination as well as the suspension device with a waveguide.

The same vertical combination but disassembled into its individual parts, is illustrated in FIG. 4. At the top is depicted the suspension device for the vertical insert and provided with a curved section 40a. The suspension device as well as the waveguide 40 is attached to a cross-beam 39 of the rack.

Directly therebelow is depicted the housing for the transmitter 1. It consists primarily of a sheet metal shell with U-shaped cross section, at the upper and lower ends of which respective pairs of guide rails are located. Guide rails have also been placed within the U-shaped shell, although of a different type than those serving for the connection of the individual units below one another. Assemblies, constructed for stacking one above the other, for example, 41, 42, 43, 44, are inserted into such shells. These assemblies have plug connections at their rear or inner faces for automatic completion of the desired connections. At the bottom of the units, for example of unit 1, there is sufficient space 21 for internal wiring under the individual assemblies. Of course, instead of the boxes 41, 42, 43 and 44, flat plug-in type assemblies consisting of printed circuit plates equipped with plug connections also can be used. This art is sufficiently known, that further explanations are believed superfluous. The component units for the modulator 3, which is located under the transmitter 1, are generally designated by the numeral 45. The power supply unit 6, disposed therebelow, may comprise the usual transformers, rectifiers, filters and the like. Since, as a rule, only very few supply voltages are necessary for modern signaling equipment utilizing semi-conduction, a spatially small power supply unit normally may be employed. The assignment of the individual assemblies according to units follows appropriately in accordance with their functional succession.

On the right hand side of FIG. 4, next to the assembly 41, is illustrated a waveguide bridge 29, and at the very bottom of FIG. 4 appears the additional unit 9 for the public current supply. This likewise is provided with a pair of guide rails 19 at its upper side, and, as previously explained, serves particularly for the distribution of the public supply connections to the various vertical inserts located within a rack.

FIG. 5 illustrates in perspective a variation, which is particularly favorable for many cases, of the suspension device in relation to the waveguide connection and in relation to the unit located directly thereunder, e.g. the transmitter or the receiver.

In the construction of this figure is disposed at the top of the unit, adjacent the rear side thereof, a suspension device for a unit having a waveguide connection. This form of construction has the advantage that the waveguide bridge 29 can be dropped out, as will be apparent, for example, from FIG. 1. As shown in FIG. 5, the waveguide connection 65 extends from the interior of unit 12, terminating at a flange 64. This flange is retained at both sides on the guide rails 19a, and passing through it are screws 14 for securing the unit. The guide rail pairs 19a can be clearly recognized in this figure. The handle 16 serves on the one hand as a handle for the unit and on the other hand as a supporting means when unit 12 is slid in and out.

The suspension device in the rack is illustrated at the upper side of this figure. Disposed in the rack is a cross member 27, to which a frame 67 is attached, and to which in turn the guide rails 19 are attached. Between the guide rails is a waveguide flange 63 which is securely attached to the rack structure and serves as a counter flange for the flange 64 at the side of the unit. The waveguide 62 terminates at this flange, which waveguide is branched off from the waveguide sections, which eventually lead to the antenna system. In order that the assembly screw 14 or the pair of guide rails 19 and 19a center the two waveguide flanges for possible reflection-free transition with respect to each other, it is expedient, as indicated in the figure, to provide additional centering pins which, for example, can be located on the unit, i.e. on flange 64. Suitable centering holes 66 are depicted on the flange 63 in the upper part of the figure. For this purpose, the centering pins as well as the screws 14 should be conically tapered on their leading ends so that they can readily be inserted into the corresponding centering holes 66.

If space is still available around the waveguide flange in the suspension device, particularly on the frame 67, plug socket units may be provided thereat for the connections of the conductors at the side of the rack, in which case corresponding counterparts for the unit would be located on the flange 64 thereof. At the plug-socket rows, conductors are disposed which come from other plug-socket pairs which, as already explained and which will be further explained with the aid of subsequent figures, insure the electrical connection of the rack and of the upper unit. To prevent confusion, such plug-socket connections, which are located underneath the waveguide flanges 64, are omitted in this figure. Their arrangement, however, will be readily perceived from the following figures.

FIG. 6, like FIG. 1, illustrates combinations of different unit assemblies and unit groupings in a single rack structure. While in FIG. 1 a linking station with diversity receivers was shown, part A of FIG. 6 represents the terminal station of a directional radio system. This comprises a transmitter 1, receiver 2, modulator 3, demodulator 4, power supply unit 6, voltage regulating unit 5 and the additional unit 9 for the current supply.

FIG. 6 at the left hand side illustrates a transmitting terminal station for unilaterally directed operation. In this station the voltage regulating unit 5 is inserted between the power supply unit 6 and the actual units 1 and 3 containing the signaling apparatus.

The same arrangement exists in part B of FIG. 6 in which a receiving terminal station is illustrated.

Part C of FIG. 6 comprises two radio relay stations which are similarly constructed as the end station according to part A. However, the modulation equipment or, as the case may be, demodulation equipment, is spatially separated in the rack from the transmitting and receiving equipment. Modulator 3 and demodulator 4 lie in each case to the right of the appertaining transmitting or receiving equipment. Finally, a combiner 8 is arranged to the extreme right in the figure in the event these two transmitting and receiving installations must be differently combined with each other, for example, for diversity purposes.

In many applications it may be necessary or desirable to provide electrical junction, distribution or supervision panels. For this purpose, it is expedient to provide at appropriate places between the units additional small units which are correspondingly or similarly constructed mechanically to the units themselves, i.e. provided with a pair of guide rails at least at their upper or lower ends, and which serve the purpose referred to.

Thus, for example, distribution panels can very simply be suitably provided between two units in a vertical insert which then are constructed exactly as the other units, as far as the electrical connections and mechanical mounting are concerned. The actual distribution panel is then placed on the front panel of an inserted distribution unit. An example of such an inserted distribution panel is designated in FIG. 6, part C, by the reference numeral 55 and illustrated between the modulator and demodulator installations.

FIGS. 7 and 7a illustrate one of the guide rail pairs already mentioned as used in the rack suspension or, as the case may be, on the bottom ends of each unit. FIG. 7 shows the essential parts at the bottom of a unit 12, which is only indicated in part by a dot-dash line. Between the pair of guide rails which are securely connected with the unit 12 is a plug board 13a which is attached to a supporting member 17 which is securely connected to the guide rails 19. The fastening of the guide rails 19 to the unit 12 or, in its stead, a suspension device can be effected by a screw or rivet connection, or for example, also by spot welding. Some fastening points for this purpose are designated by the numeral 47.

The counterpart of the combination of guide rail and plug according to FIG. 7 is illustrated in detail in FIG. 8. Since this counterpart is also located at the upper side of the same unit 12 (mirror-inverted arrangement of the guide rails and of the contact boards), FIG. 8 depicts the upper side of a unit 12. Such guide rail pair is designated by the numeral 19a and is so constructed that it can easily be slid into the pair of guide rails 19. Between the two guide rails is a socket board 13 which is aligned with the plug board 13a. FIG. 8a illustrates a top view of a unit indicating details of the suspension and electrical connections. The socket board 13 is connected with the guide rails 19a by means of the supporting member 15. A long clamping screw 14 extends through the supporting member 15, at the right side. The head of such screw projects through the front panel of the unit and can be turned with a screwdriver from the front of the structure, (also see FIG. 5). The screw is provided with a threaded end 18a which engages the threaded bore 18 located in the supporting member of the counterpart illustrated in FIG. 7. The respective pairs of guide rails 19 and 19a are identical for all units. After insertion of a pair of rails 19a into a pair of guide rails 19, the threaded shank 18a is automatically centered on the threaded bore 18, and tightening screw 14 the structural unit can be securely fastened and electrically connected with the structural unit above it.

is hingedly connected and facilitates the insertion or withdrawal of the unit, as well as forming a carrying handle. The free space adjacent the socket board 13 can conveniently be used to fasten other sockets such as, for example, the high-frequency or intermediate frequency conductors previously mentioned. Furthermore, as will be apparent, the plug and socket boards are so fastened to the guide rails that corresponding hand plugs also can be inserted therein. In this way, spatially separated units also can be connected by means of flexible cables and such plugs, eliminating rack wiring which otherwise would be required. Furthermore, in FIG. 8a and in FIG. 9 a high-frequency-coaxial-plug socket 20 is mounted on a front panel 48, on which are also located the handles 16.

FIG. 9 presents a side view of portions of the structure of FIGS. 8 and 8a with one guide rail being omitted so that the connector elements 13 and 13a between the guide rails can be seen. The coaxial socket 20, with its supply line 20a leading into the inner wiring space 21 of the bottom unit 12 also can clearly be seen. The conductor 51 extends from the plug board 13 into the wiring space of the upper structural unit. As will subsequently be explained in detail, some of these conductors can also be passed through the wiring space of such unit and extended to the upper row of plug sockets of the plug board 13 thereat, the leads to the socket board 13 being indicated by the numeral 52.

FIG. 10 is a side view of a distribution panel, the guide rails being eliminated which is mounted at the bottom of an assembly 12. Socket boards 54 are provided as distributors into which hand plugs 22 may be inserted. From these hand plugs 22 conductors run to other racks, to other apparatus and units, to a signal rack, to the telephone exchange, or to testing and measuring apparatus. To prevent unintentional removal of such hand plugs 22 and to provide a facing for the unit, a cover sheet 56 is provided at the front side of the unit. The connection between the socket board 13 and the socket board 54 is established by conductors 53. The clamping screw 14 can be seen at the rear side of the structural units, the screw head likewise being visible at the front side of the cover sheet 56. Such a unit can also be provided to distribute the supply voltage to different power-supply units of a number of vertical units. Such a distribution panel is indicated by 9 in FIG. 1, from which figure an example of the wiring can also be seen. Naturally, not only the power-supply voltage itself, but for example also the supply voltages between the individual units can be interchanged.

Since frequently in modern equipment only a small number of supply voltages will be necessary, e.g., a voltage of 9 or 12 v. for transistor circuits and a controlled voltage of perhaps the same order for voltage-sensitive structural elements, it is expedient to dispose the supply connections in all connector elements 13, 13a on the same pins, e.g., 49, 50, in FIG. 8. These voltage supply conductors then correspond in each unit, as well as on each plug board, whereby no wiring changes are necessary in a change in the various unit arrangements etc. It is expedient to likewise proceed with respect to signal conductors or other conductors which are identical in many units and serve the same purposes. It is therefore expedient to provide from the outset sufficient terminals in the plug and socket boards, possibly by using double rows of such plug and socket boards whereby different apparatus components of a directional radio system can be grouped into a vertical insert, without any change in the wiring, according to the mechanical assembly requirement.

Since sufficient space is available in the top structural unit between the rails 19, it is, in most cases, expedient not to include a junction panel for exchange calls or the like, which is necessary in that place, in the suspension device, but to provide already in this interspace of the top upper part of this figure shows a cross section, while a top view on the top structural unit is drawn thereunder. The junction panel is formed by plug bushing ledges 58 which are attached between the two top guide rails 19. By narrowly arranging the holes 60, the suspension level can be varied at will and adjusted to the prevailing conditions. Examples of these variations can be found in FIGS. 1 and 6.

It will be noted from FIGS. 12 and 12a that behind the suspension device and in front of the rear side of the rack there is still sufficient space in which to dispose connecting cables 28 which, like all connecting cables of the system are flexibly constructed and are not securely connected to the rack. Thus, the wiring of the entire installation takes place, on the one hand, by means of such flexible cables and on the other hand by means of the plug socket elements on the individual units. Consequently, permanent rack wiring is completely eliminated.

A suspension device which also contains a waveguide connection is again illustrated in FIG. 13, which is a sectional view extending parallel to a side wall. In the upper part of the unit 12 are the connections mentioned in the description of FIGS. 11 and 11a with plugs 23 and 24. Behind the cross member 27 for mounting the guide rails for the suspension device is a waveguide 31 which extends from a lower vertical insert to a point above the vertical inserts in the rack for the waveguide connectors and the like. A flexible waveguide piece 30 provided for the same purpose is visible above the junction panel for the unit 12 and extends from the waveguide flange attached to the front side on the suspension device. Proceeding from this flange the connection is established to the unit 12 through the waveguide bridge 29 which is equipped with flanges on both ends and which can easily be detached at any time.

It is obvious that by using the principle in accordance with the invention, a rack construction is attained, through which considerable advantages in relation to hitherto known systems can be achieved, especially for the practical operation of the most dissimilar installations of a directional radio system.

It will be understood that variations and modifications may be effected without departing from the spirit and scope of the novel concepts of this invention.

We claim:

1. An apparatus arrangement for electrical communication equipment, particularly for directional radio equipment, utilizing a rack structure having suspension devices for supporting vertical inserts, some of which can be pushed in and placed side by side in the rack or are retractable, and which are to be electrically operatively connected with other inserts, other racks, and with an exchange, characterized in that respective apparatus assemblies constituting a structural unit such as a transmitter, receiver, modulator, power supply, and by intercalation, if necessary, an electrical junction panel, a distribution panel, and a monitoring panel, originating from at least one suspension device, are connected together by successive suspension, in a vertical row in an arbitrarily selected sequence, the means for effecting such suspension comprising guide rails of like construction located at the top and bottom of the respective unit assemblies whereby guide rails of vertically adjacent units can be interlocked with each other, and connector means disposed adjacent said guide rails for completing at least the majority of electrical connections, such as electrical plug and socket boards for the necessary supply conductors, high-frequency conductors and the like.

2. An arrangement according to claim 1, wherein such structural units each comprise a U-shaped shell, open at its front side, of a length corresponding to the specific space requirements of the unit, which is structurally terminated at each end by the combination of such guide rails and plug connector elements.

3. An arrangement according to claim 2, wherein said connector means comprises plug-in elements such as plug and socket boards which are so arranged on each unit that conductors carrying the same supply voltages, signal voltages, and similar conductors for the various units are respectively connected to like terminals on the corresponding plugs and sockets of each unit, which conductors, if necessary, traverse the associated unit.

4. An arrangement according to claim 1, wherein detachable conductors are provided between units hanging side by side (each forming a vertical insert) which form necessary horizontal cross connections, and if necessary, for example for current supply from a public power supply circuit, a type of multiple distributors are provided which carry corresponding guide rails and plug connector elements and are attachable to the free lower connection elements of the respective cooperable vertical inserts.

5. An arrangement according to claim 1, wherein necessary connections such as high-frequency exchange connections, particularly a waveguide antenna connection, terminating in a connection flange, is in each case arranged at the top of the unit and preferably also at the top of a vertical insert, which connection is disposed at the front side of the unit and easily accessible, and a semicircular-shaped waveguide section, having cooperable flanges, for effecting extension of said high-frequency connection to the adjacent vertical insert.

6. An arrangement according to claim 1, wherein necessary connections such as high-frequency exchange connections, particularly a waveguide antenna connection, terminating in a connection flange, is in each case arranged at the top of the unit and preferably also at the top of a vertical insert, which connection is disposed at the rear side of the unit opposite a high-frequency connection thereat, said connections being provided with cooperable centering elements for effecting alignment of the connections when the unit is inserted, and screw means for effecting securement of such connection which are operatively accessible from the front side of the unit.

7. An arrangement according to claim 3, wherein the suspension device located at the top of a vertical row of units comprises a combination of guide rails and plug-in connector elements whose electrical connections are to be extended to an exchange, or to other vertical inserts, or to other racks, by means of plug-in connection boards disposed in the space between the guide rails, forming a junction panel on the suspension device.

8. An arrangement according to claim 3, wherein electrical connections of the unit with those located directly on the suspension device, in particular such connections which provide the intermediate frequency, lower frequency, and direct current conduction to other racks, other vertical inserts or the exchange, extend to socket boards disposed in the free space between the upper guide rails of such unit, forming a junction panel thereon.

9. An arrangement according to claim 1, wherein the preferred assignment in vertical succession, beginning from the suspension device, is transmitter, modulator, and power supply, and in the adjacent vertical row, receiver, demodulator, and power supply, the transmitter being connected at the front side of the structural units with the receiver through a length of flexible cable which is provided at both ends with plug connections and which conducts the auxiliary frequency for the receiver oscillator.

10. An arrangement according to claim 1, wherein, for the connection of the unit assemblies with the current supply, any signal control installations of the rack, to the incoming and outgoing telephone conductors, and to any cross connection of the individual vertical rows, flexible cables are provided, the vertical inserts being so disposed that therebetween, as well as between the limits of the rear sides of the units and the rack, narrow spaces are provided in which such cables can be disposed.

11. An arrangement according to claim 1, wherein at the front side of a unit assembly, adjacent the top thereof and the combination of guide rails and connector elements located thereat, there is disposed a member which is movable between an inoperative retracted position and an extended operative position for facilitating the insertion or withdrawal of the associated unit, which member is also constructed for use as a handle for the particular unit assembly.

References Cited

UNITED STATES PATENTS 3,316,461   4/1967   Henke et al. _____ 317—120
3,394,287   7/1968   Zitzmann et al. _____ 317—99

LEWIS H. MYERS, *Primary Examiner.*

D. A. TONE, *Assistant Examiner.*

U.S. Cl. X.R.

317—120